US006042323A

United States Patent [19]

Cervantes et al.

[11] Patent Number: 6,042,323

[45] Date of Patent: Mar. 28, 2000

[54] WIRE HARNESS HANDLING AND STORAGE SYSTEM

[75] Inventors: Arturo Cervantes, Downers Grove; Peter Ingwersen, Gilberts; Larry Kurek, Elgin; Robert Lucenta, Naperville; Eric Stenstrom, Warrenville; Steven Wright, Glen Ellyn, all of Ill.

[73] Assignee: Molex Incorporated, Lisle, Ill.

[21] Appl. No.: 08/926,110

[22] Filed: Sep. 9, 1997

[51] Int. Cl.[7] .......... B65G 1/00

[52] U.S. Cl. .......... 414/331.08; 414/331.11; 29/759

[58] Field of Search .......... 29/33 M, 742, 29/748, 749, 759–760, 863, 865, 866; 414/331.08 O, 331.09, 331.1, 331.11

[56] References Cited

U.S. PATENT DOCUMENTS

| | | | |
|---|---|---|---|
| Re. 24,124 | 2/1956 | Pierce | 414/794.5 |
| 3,075,656 | 1/1963 | Pearne | 414/331 |
| 5,606,795 | 3/1997 | Ohba et al. | 29/863 |
| 5,745,975 | 5/1998 | Heisner et al. | 29/564.6 |

*Primary Examiner*—Lee Young
*Assistant Examiner*—Bobby Rushing, Jr.
*Attorney, Agent, or Firm*—Charles S. Cohen

[57] ABSTRACT

A wire harness handling and storage system particularly suitable for use in connection with automated harness making machines includes a harness unloading mechanism that unloads a completed wire harness from the harness-making machine and a storage cart that receives a plurality of completed wire harnesses in a plurality of storage racks maintained at different elevations on the storage cart. The handling and storage system is adaptable to handle both short wire harnesses about 6 inches in length) to longer wire harnesses (about 10 feet in length) without tangling or damage to connectors applied to the wires of the wire harnesses. For unloading and placing the longer wire harnesses, a gripping mechanism is provided that picks up the wire harnesses and places on the storage cart in a controlled movement. The unloading and gripping mechanisms are linked with a controller knows the length of the storage areas of the cart for proper, high-density loading thereof.

24 Claims, 8 Drawing Sheets

WIRE HARNESS HANDLING AND STORAGE SYSTEM

BACKGROUND OF THE INVENTION

The present invention relates generally to the production and collection of electrical wire harnesses, and more particularly to an apparatus for handling and storing electrical wire harnesses of varying lengths.

Many machines are known in the art for production of electrical wire harnesses. Such harnesses typically include a plurality of conductive wires to which one or more electrical connectors are terminated. These connectors may be terminated to opposing ends of the wires of each harness. In the past, as exemplified by U.S. Pat. No. 5,033,188, issued Jul. 23, 1991, these harnesses have typically been pushed from their assembly path by ejector cylinders into a collection bin. This type of collection does not incorporated a controlled motion and rather relies upon gravity to move the wire harness once it is completed. This type of collection process leads to tangling of the wire harnesses.

In addition to this tendency for tangling, the assembly machine operator is required to shut down the machine for a significant amount of time when the collection bin is full to remove and replace the collection bin. Often, additional connectors are terminated to the harness wires between the connectors terminated at the ends of the harness wires. When this type of construction occurs, it is imperative that the harnesses and their connectors be protected when they are removed from their manufacturing machine. Also, a gravity-feed collection process will exacerbate the tangling of the wire harnesses when the harnesses are being produced in varying lengths by the same assembly machine, such as from about 6 inches to about 10 feet in length. In addition, in instances where the harness connectors contain circuit boards, there is a concern to keep the circuit boards free from electrostatic discharges during handling that could result in damage to the circuits on the circuit boards.

The present invention is directed to a wire harness storage and handling system that overcomes the aforementioned disadvantages.

SUMMARY OF THE INVENTION

The present invention overcomes these disadvantages by providing, in one aspect of the present invention, a wire harness storage cart that is engageble with a wire harness manufacturing machine and easily removable therefrom, the harness cart having a plurality of racks that support a like plurality of harnesses carriers, each of the harness carriers having an elongated engagement track that receives in serial order, a predetermined number of wire harnesses and holds them thereon in a protected, non-tangled condition.

In another aspect of the present invention, a wire harness handling and storage system is provided that provides a storage buffer for a wire harness assembly machine in which the system accommodates both short and long length wire harnesses having multiple connectors terminated thereto and which system minimizes the downtime of the harness assembly machine in order to remove completed wire harnesses from the system.

In another principal aspect, the present invention provides a harness storage cart that is movable between the harness assembly machine and another operative area wherein the harness storage cart has plurality of slotted harness carriers that are adapted to receive a plurality of leading end connectors of a corresponding plurality of wire harnesses. A wire harness unloader that is positioned at the downstream end of an associated wire harness assembly machine engages the harness storage cart by means of one or more ejectors that operate at the same speed as the assembly machine. The wire harness unloader has an element that slides along the length of the harness carriers in a controlled motion to move the completed wire harnesses into place on each harness carrier.

In still another principal aspect of the present invention, longer length harnesses are accommodated by a gripping apparatus that follows a controlled motion to successively picks up each wire harness after it is made and places it on the harness storage cart at a level above the shorter length wire harness carriers. The gripping apparatus may include a programmable control means that places the completed, longer wire harnesses at a predetermined spacing on the storage cart. The control means has the length of the storage cart programmed into it so that it knows when the storage cart is full of harnesses.

In yet another principal aspect of the present invention, both the longer length wire harness gripping apparatus and the other length wire harness unloaders are controlled in their movement by a common unloading assembly that moves back and forth lengthwise along the wire harness storage cart. With this controlled movement, the likelihood of tangling or damage to the harnesses is significantly reduced.

These and other objects, features and advantages of the present invention will become apparent from the following detailed description, taken in conjunction with the accompanying drawings, wherein like reference numerals refer to like parts.

BRIEF DESCRIPTION OF THE DRAWINGS

In the course of the following description of the detailed description, reference will be made to the attached drawings wherein like reference numerals identify like parts and wherein.

DETAILED DESCRIPTION OF THE PREFERRED EMBODIMENTS

The present invention is directed to a wire harness handling and storage system that is used in association with a wire harness making apparatus to handle and store wire harnesses of varying lengths. In this regard, the present invention finds appropriate utility when used in conjunction with a wire harness-making apparatus that applies both programmable and non-programmable connectors to a plurality of wires. Such an apparatus is described in detail in U.S. patent application Ser. No. 08/700,895, filed Aug. 21, 1996 and assigned to the assignee of the present invention, the disclosure of which is incorporated herein by reference.

The harness-making apparatus described in the aforesaid application Ser. No. 700,895 application produces wire harnesses of varying length with two or more connectors applied to a plurality of wires. The connectors applied by said apparatus to harness wires may be of different types, such as conventional connectors or programmable connectors.

Figure 1:
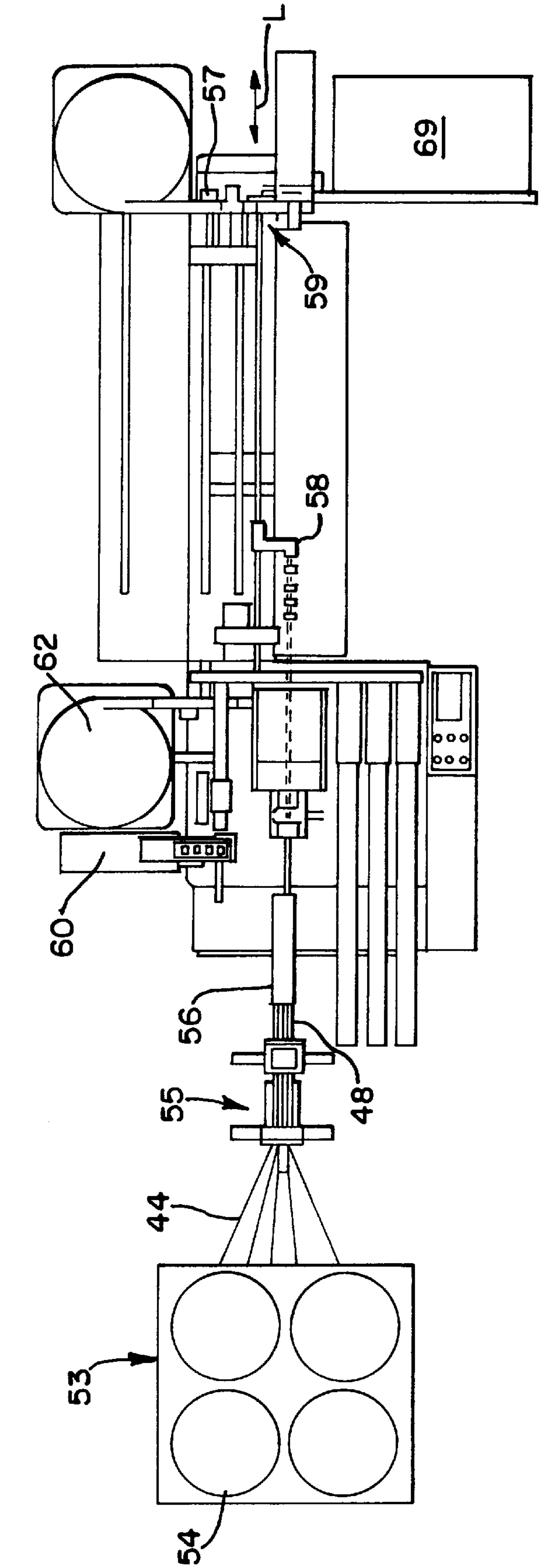
FIG. 1 PRIOR ART
FIG. 1 is a plan view of a known wire harness making apparatus as described in a copending application with which the present invention finds optimum utility.

Such a harness-making apparatus is illustrated in plan view in FIG. 1 and generally at 50. The apparatus 50 receives a plurality of harness wires 44 from a wire supply 53 having individual wire reels therein 54. The harness wires 42 are fed through a detector assembly 55 that detects and confirms their integrity as the harness wires 44 are driven by a suitable wire feed assembly 56.

Far downstream of the wire feed assembly 56 is a lead connector supply station 57 where wire connector components are received in serial order and subsequently conveyed to a carriage assembly 58. The carriage assembly 58 reciprocates along a longitudinal feed path L of the apparatus 50 and initially moves into a termination station 59 where a leading connector element advanced from the supply station 57 is terminated to the leading free ends 48 of the advancing harness wires 44.

An additional connector supply 60 may be provided to supply second connector elements to the termination station 59 and these second connector elements may be of a programmable nature, i.e., they receive a circuit board in engagement therewith. The second connector elements are terminated to the harness wires at the termination station 59 and then the circuit boards are applied to the second connector elements. Additional connector components, of a non-programmable nature may also be supplied from an additional connector component supply 62 to the harness wires at subsequent locations.

Figure 2:
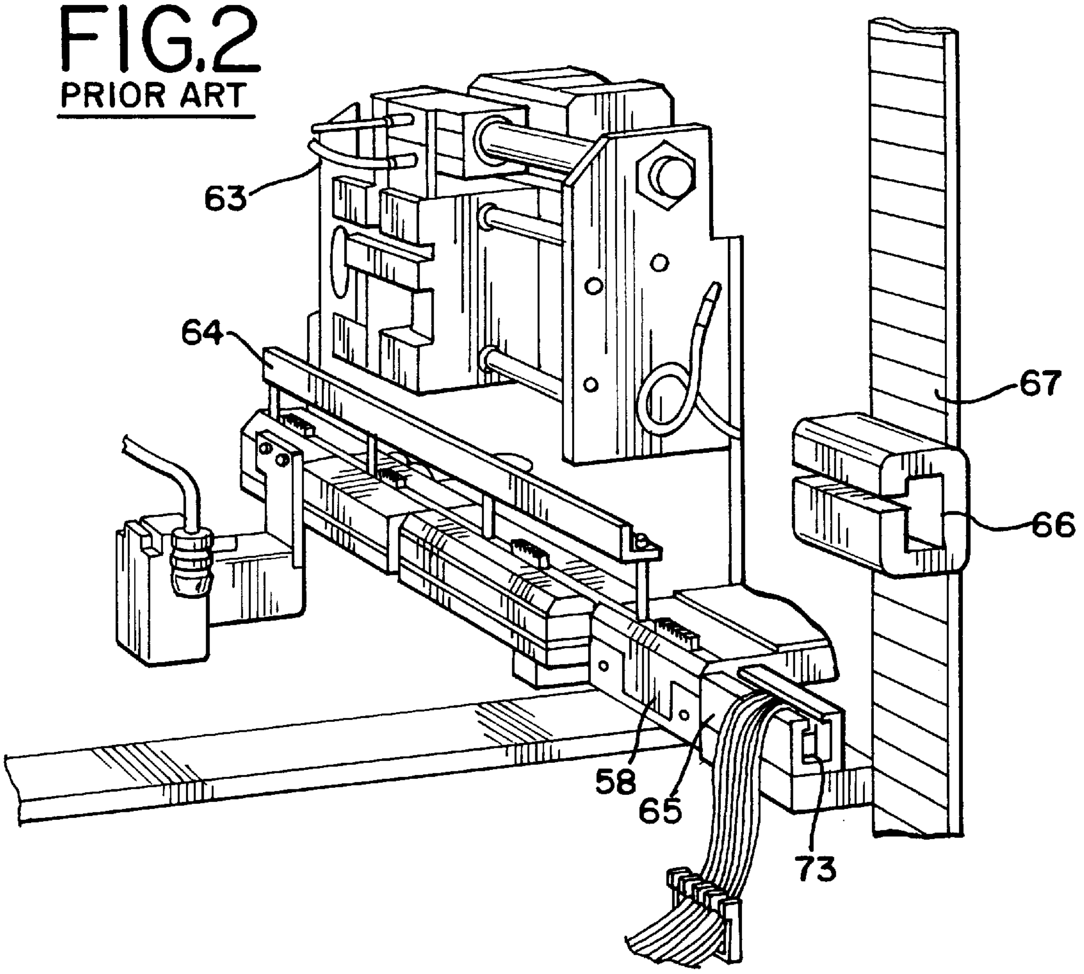
FIG.2 PRIOR ART
FIG. 2 is a perspective view of a lead connector element and wire harness ejection assembly used with the harness-making machine of FIG. 1.

After termination of all the preselected connector components to the harness wires, the harness wires are cut in order to set the length of the wire harness. The finished wire harnesses are dragged along the feedpath L to a wire harness ejection station 63 (FIG. 2) where a slider mechanism 64 serially moves a new leading connector into the carriage assembly 58 and out into a stationary holding nest 65 where it is eventually transferred to a movable carrier 66 fitted on a moving transfer belt 67 that shuffles the harnesses to a collection bin or cart 69.

Figure 3:
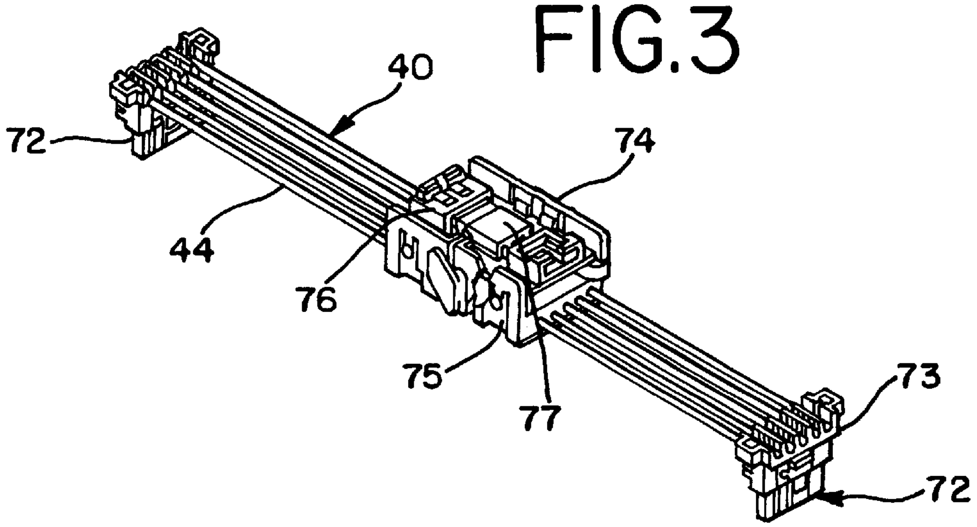
FIG. 3 is a perspective view of a short length wire harness having multiple connectors, both programmable and conventional terminated thereto that the present invention is particularly useful in handling.

FIG. 3 illustrates a wire harness 40 of relatively short length having two non-programmable, or "standard", connector elements 72 terminated to the opposing ends of a plurality of electrically conductive wires 44 and a programmable connector 74 terminated to the harness wires 44 intermediate of the standard connector elements 72. As is known in the art, the programmable connector 74 includes an exterior housing 75 that receives a circuit board assembly 76 with one or more integrated circuits formed on a chip 77. The length of the harness 40 illustrated may be as little as 6 inches long.

Figures 4, 5:
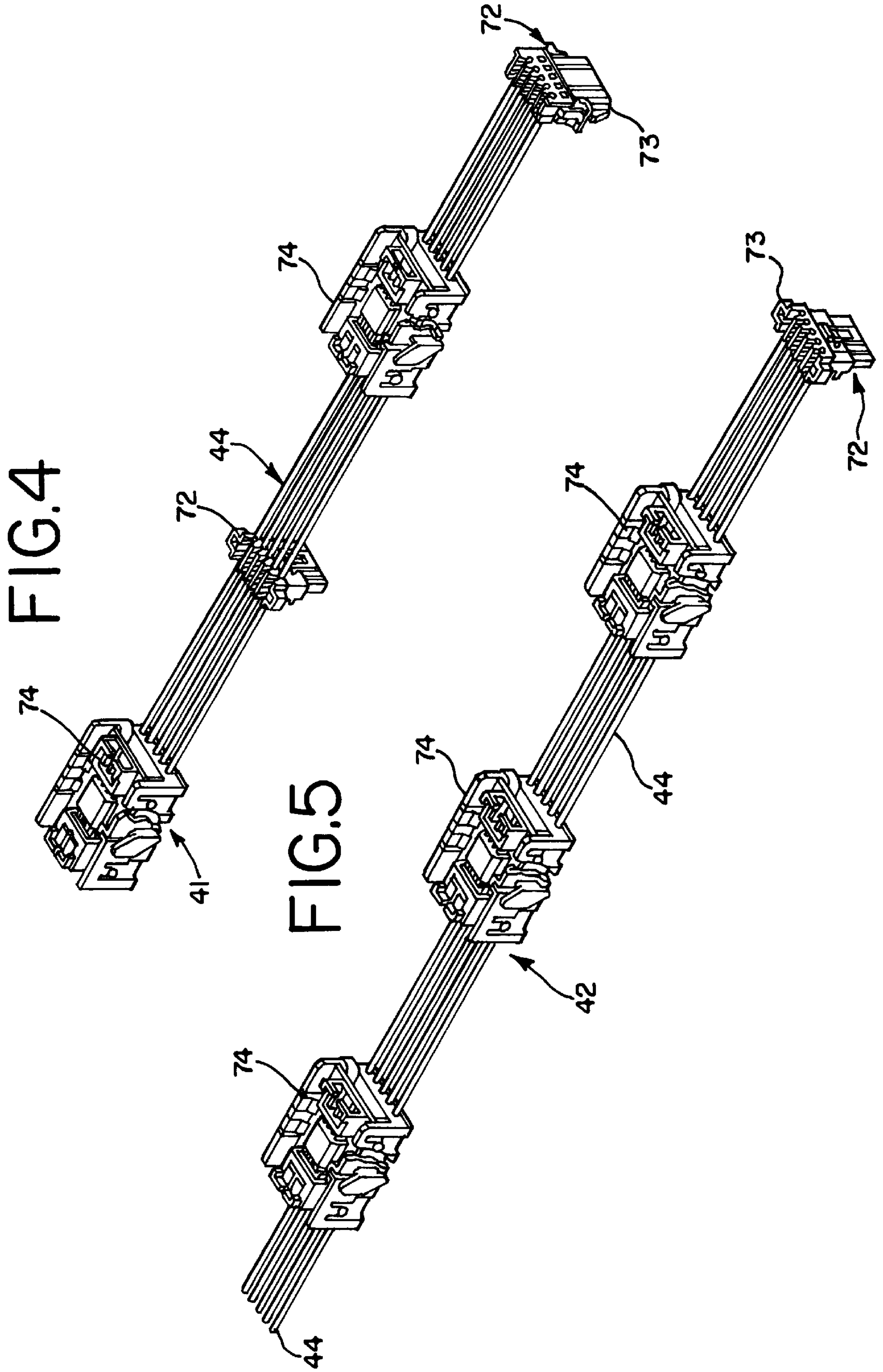
FIG. 4 is a middle length, multiple connector wire harness that the present invention is particularly useful in handling.
FIG. 5 is a long length, multiple connector wire harness that the present invention is particularly useful in handling.

FIG. 4 illustrates a wire harness 41 of medium length having four connectors 72, 74 terminated to the harness wires 44 at different locations along the length of the wire harness 41.

FIG. 5 illustrates a longer length wire harness 42, of a length that can extend as much as 10 feet (120 inches), with four or more connectors terminated thereto at different lengths along the wire harness 42 and with a set of free wire ends 44 at the trailing edge of the wire harness 42. As previously mentioned, in the prior art, when a harness was completed on a harness making machine, the wire harness was typically ejected into a collection tray or bin. This process is impractical to use in the manufacture of wire harnesses that use modular connectors having circuit boards as shown in FIGS. 3–5 because the silicon used in the chips and circuit boards may be highly reactive and prone to damage from electrostatic discharges during handling. It is therefore beneficial to handle and store such wire harnesses in a manner that minimizes the physical handling of the harnesses, especially the modular connectors and their associated circuit boards.

The present invention has the ability to automatically remove wire harnesses from the apparatus 50 regardless of the length of the harnesses produced, from about 6 inches to as long as about 10 feet, regardless of the spacing of the connectors terminated to the harnesses. The present invention is also capable of handling the wire harnesses at the same speed at which they are manufactured and in a controlled fashion which reduces the likelihood of electrostatic discharges from occurring during the handling of the harnesses and damaging any circuit boards associated with the harness connectors.

Figure 6:
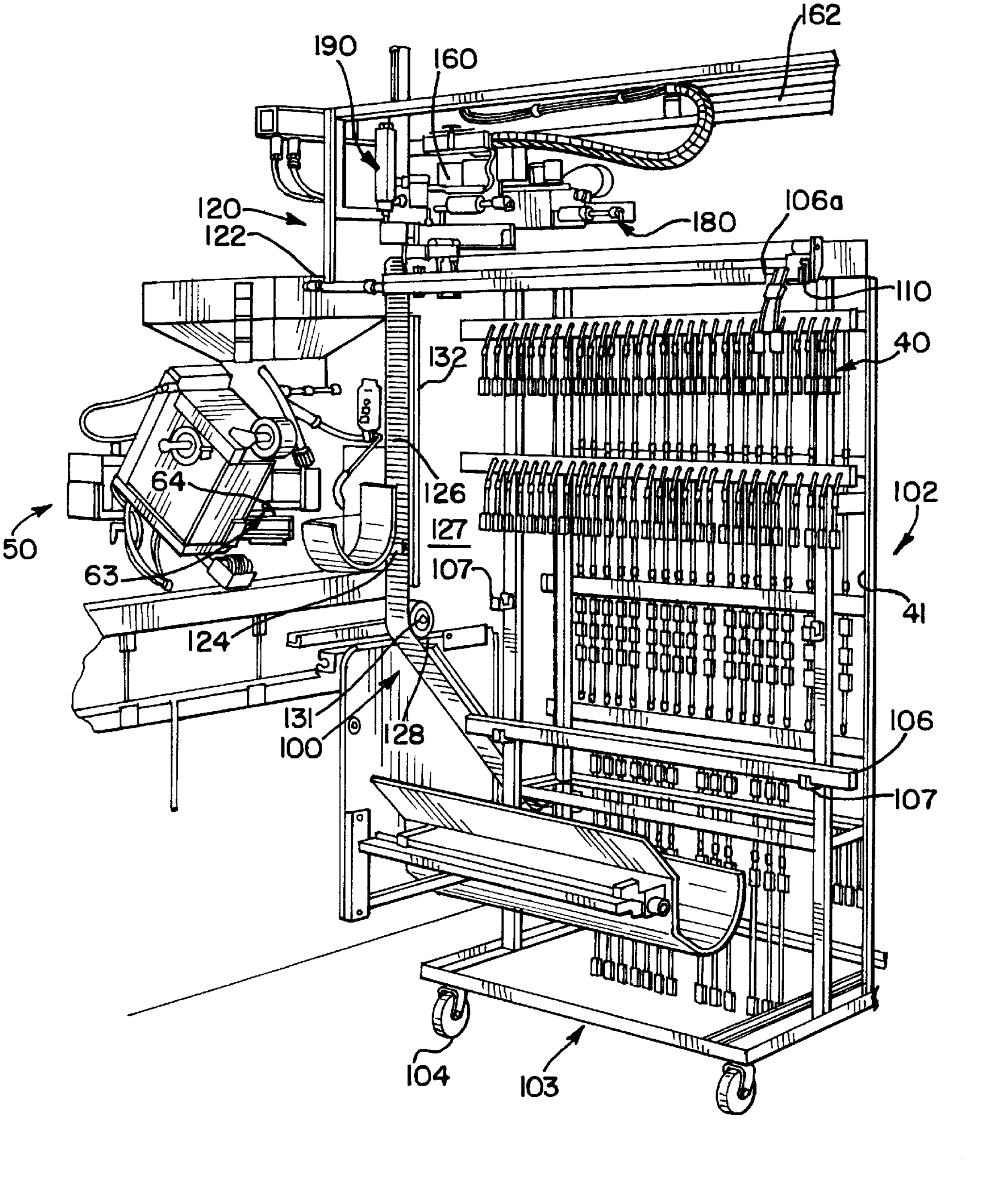
FIG. 6 is a perspective view of a wire harness unloader and storage system constructed in accordance with the principles of the present invention illustrated in place at the wire discharge assembly of FIG. 2 in a position to receive completed wire harnesses.

Turning now to FIG. 6, a wire harness handling and storage mechanism constructed in accordance with the principles of the present invention is generally illustrated at 100. This mechanism 100 is positioned alongside of the harness-making apparatus 50 in proximity to the completed harness ejection station 63. The overall handling and storage system 100 includes a harness storage cart 102 for collecting the different sized wire harnesses 40–42 in serial order as they are produced by the apparatus 50. The harness storage cart 102 has a base 103 that includes a series of wheels 104 that permit it to be wheeled from its ready, working position as shown in FIG. 6 in alignment with the apparatus 50 to another processing station without incurring any significant downtime of the harness-making apparatus 50.

Figure 11:
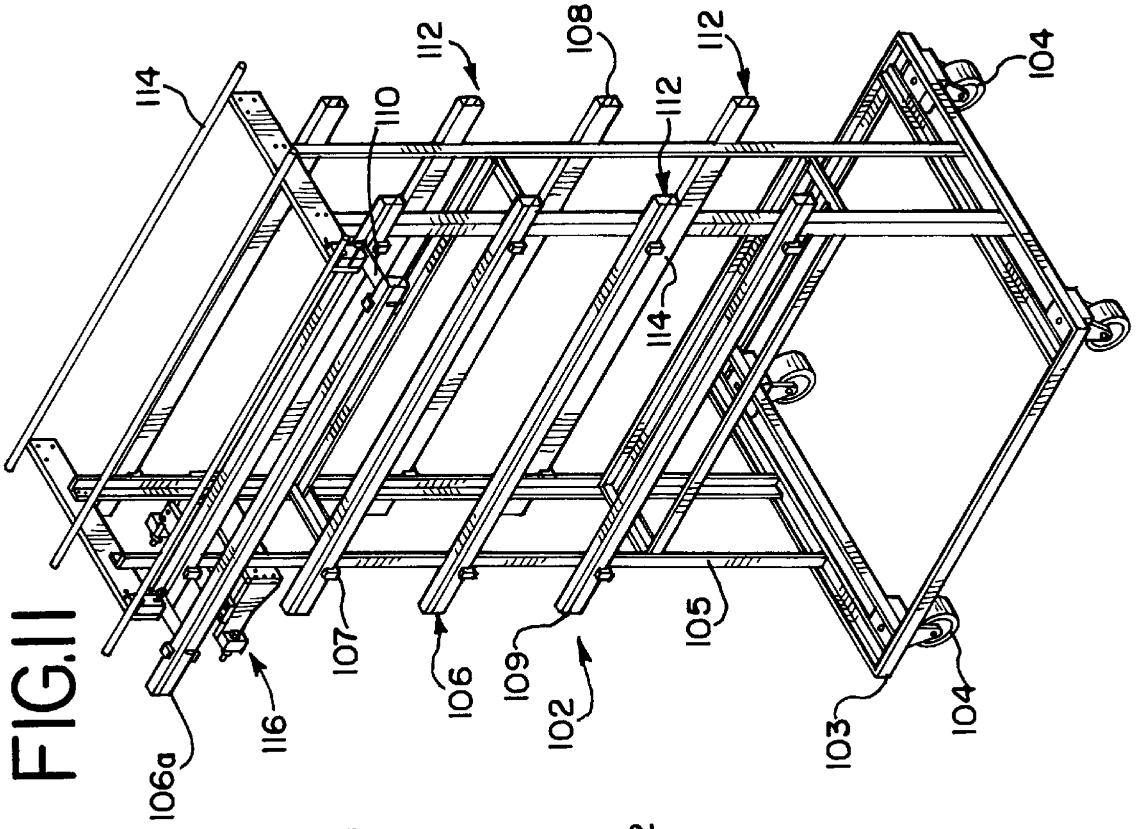
FIG. 11 is a perspective view of a harness storage cart used in conjunction with the harness making handling and storage system of the present invention.

As illustrated best in FIG. 11, the storage cart 102 further has a series of posts 105 that rise vertically up from the cart base 103. These posts 105 include means associated therewith preferably in the form of angle members 107 that define a series of horizontal storage positions on the cart 102 which constitute storage racks that support like harness collection members 106 at different elevations on the cart 102. The harness collection members 106, as exemplified by the preferred embodiment, illustrated in the Figures and described herein, may take the form of elongated, hollow tubes or channels 108 that engage the support means, preferably in a manner that supports the harness collection tubes 108 level with respect to the apparatus 50. As shown best in the end view of FIG. 11A, each harness collection channel 108 preferably includes a longitudinal slot 109 communicating with the interior 111 of the collection channel 108 in order that the storage members 106 may receive the various wire harnesses 40–42 produced by the apparatus 50 in a fashion wherein the lead connectors 73 of the wire harnesses are held within the interior of the harness collection channels 108 while the harness wires 44 extend outwardly through the slots 109 thereof.

Figure 10:
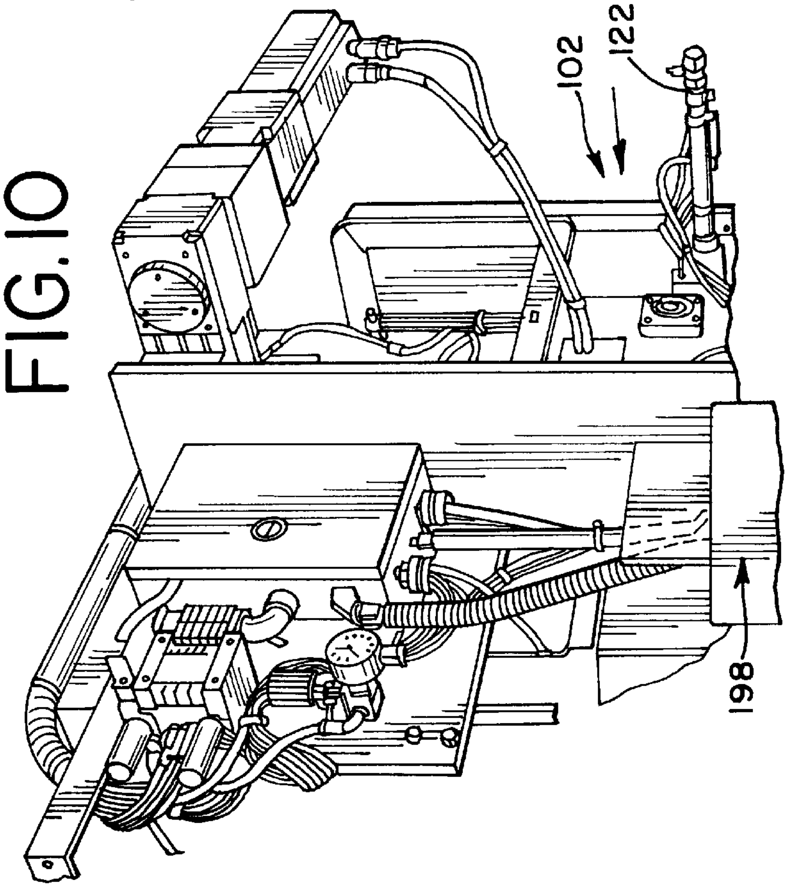
FIG. 10 is a partial perspective view taken from the rear of the harness handling and storage system of FIG. 6, looking upwardly and illustrating the short and medium length wire harness ejector mechanisms.

One of the harness collection members 106*a* is held in a loading position on the storage cart 102 in alignment with a harness unloading mechanism 120 shown illustrated in FIGS. 6, 10 & 11 as a pneumatic cylinder 122, a transfer nest 124 and a transfer belt 126. This collection member 106*a* extends slightly outwardly with respect to the other harness collection members 106 and is held in this position by one or more horizontal support extensions 110. In operation, when the harness collection member 106*a* is fully loaded with wire harnesses 40–42 and upon notice by the harness-making apparatus 50, a machine operator may easily remove it from engagement with the horizontal support extensions 110 and place it on one of the rack levels 112 defined on the storage cart 102 by the harness supports 107. In order to retain the storage cart 102 in its proper position with respect to the overall handling and storage system 100 and particularly, the harness unloading mechanism 120, the storage cart 102 is capable of being locked or clamped into engagement with the unloading mechanism vertical mounting plate 127 through a clamping assembly 116.

Figure 11A:
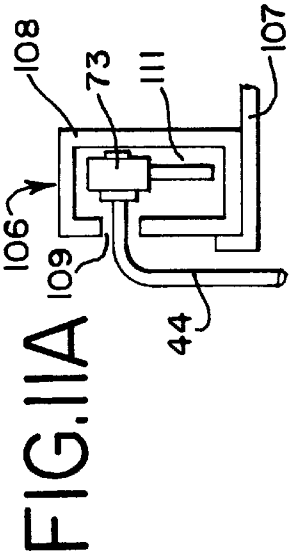
FIG. 11A is an enlarged end view of a wire harness collection member used with the storage cart of FIG. 11.

The storage members 106 held by the cart 102, are maintained at different elevations, and particularly at different elevations than the apparatus carriage assembly 58. This difference in elevation provides a buffer to the manufacturing process in that it requires a preselected amount of time for a completed wire harness to traverse the path from the harness carriage assembly 58 along the loading belt 126 to the level of the loading cylinder 122 while the harness-making apparatus 50 is operating. The apparatus 50 will preferably have a visual or audio alarm, or other such indicator that advises the operator that the harness collection member 106*a* is full, based upon the programmed memory of the unloading mechanism 120. The apparatus 50 will then stop, and an operator will replace the fully loaded harness collection member 106*a* with an empty one 106. The loaded collection member 106 is then placed in a free location on the storage cart 102. This aspect of the system 100 has been found to significantly reduce the downtime of the apparatus 50 during harness handling down to the range of about 30 seconds. It will be appreciated that each of the storage members 106, depending on the length of the harnesses produced by the apparatus 50, will provide a high density storage accommodation for the harnesses that will also prevent apparatus down time to remove completed harnesses. Also, the storage cart 102, when all of its racks are filled with wire harnesses may be easily moved from alignment with the unloading mechanisms 120 and another wheeled into its place. Due to the fact that the wire harnesses are held by each of the wire harness collection members 106 by their leading connectors as illustrated in FIG. 11A, the likelihood of the harnesses becoming tangled together is substantially reduced, if not altogether eliminated.

Figure 12:
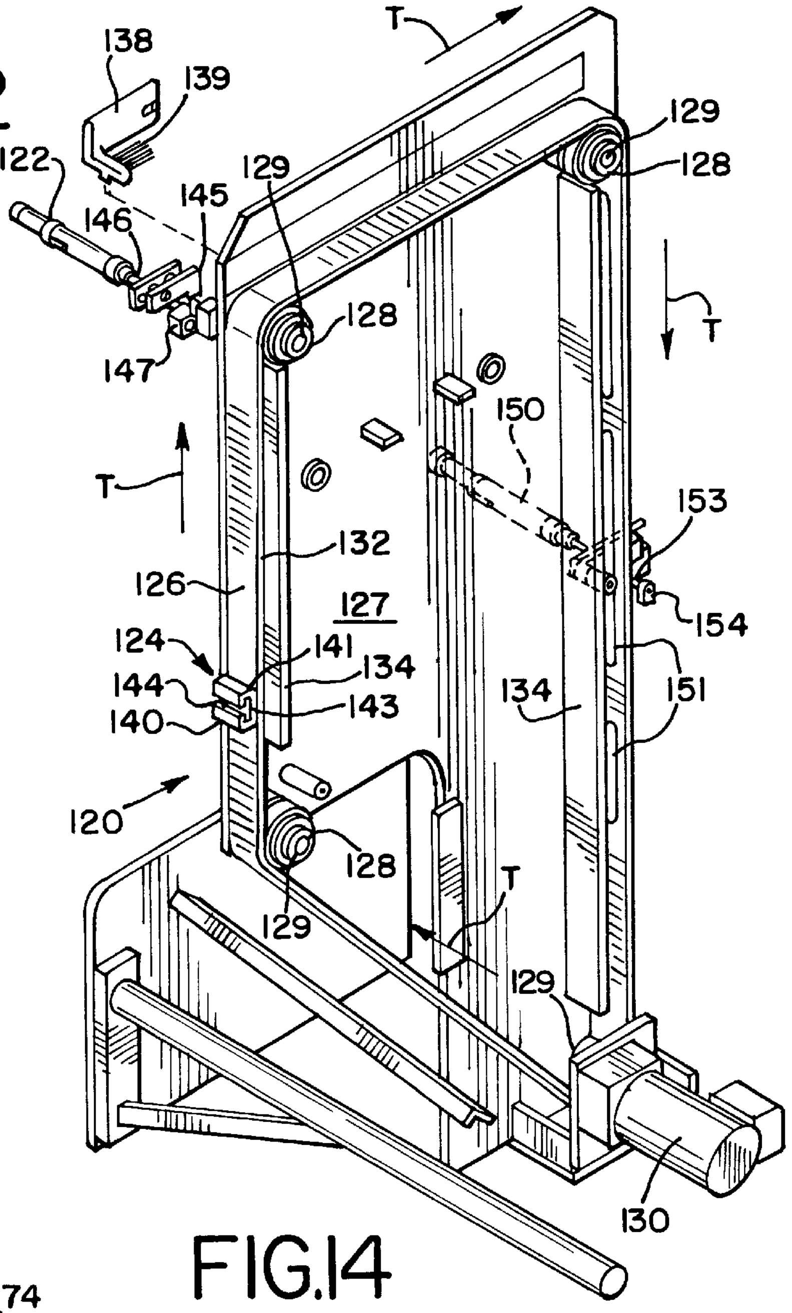
FIG. 12 is a perspective view of the wire harness transfer mechanism of the harness handling and storage system of the present invention.

The storage cart 102 may be moved into and out of alignment with the harness unloading mechanism 120 shown best in FIG. 12. The harness unloading mechanism 120 includes a vertical carriage mounting plate 127 that is positioned on the frame of the harness-making apparatus 50 and extends vertically therefrom. The mounting plate 127 rotatably supports on one or more shafts 131, a series of idler sprockets 128 disposed near the covers of the mounting plate 127 that engage a moving belt 126 that travels in a path near the perimeter of the mounting plate 127. The belt 126 and the idler sprockets 128 are driven in rotation by a drive sprocket 129 that is driven by a motor 130. The motor 130 drives the transfer belt 126 in a transfer path T The mounting plate 127 preferably includes one or more belt guides 132 that extend along the path of the belt 126 to guide it in its movement. One or more stiffeners 134 may be attached to the mounting plate 127 near the belt guides 132 to add a measure of rigidity to the mounting plate 127 and the harness unloading mechanism 120. The stiffeners 134 may also support a series of guard shields for protection of both the mechanism and its operators.

The transfer belt 126 includes a transfer nest 124 that may include a base portion 140 and a cover portion 141 that are securely affixed to the belt 126. This nest 124 has a hollow interior 143 and a horizontal slot 144 that communicates with the interior 143 so that it may receive the harness wires 40 of a wire harness, while the interior 143 of the transfer nest 124 receives the leading connector 73 of a completed wire harness 41–43 under the urging of the slider mechanism 64 (FIG. 2) which forces the leading connector 73 from the carriage assembly 58 to the transfer nest 124.

Inasmuch as the transfer nest 124 projects from the belt, the unloading mechanism 120 first includes a harness ejection means, such as a cylinder 122 which may be powered in a suitable manner, such as hydraulically or pneumatically. The cylinder 122 is mounted to the loading mechanism mounting plate 127 by way of a mounting assembly 145 that is fixed in place upon the mounting plate 127, so that the center of the cylinder 122 and its push rod 146 are in alignment with the transfer nest interior 143 so that, when actuated, the push rod 146 and its associated ram 147 impinges upon the leading connector 73 held in the transfer nest 124 and pushes it out of the transfer nest interior 143.

As described in greater detail below, the unloading mechanism 120 further includes a harness collection member loading mechanism 190 that includes a power cylinder 191 attached to a mounting bracket 192 that is in turn attached to the upper mounting plate 166 of the loading assembly 160. The cylinder 191 includes a push rod 194 that terminates in a loading ram assembly 195 having a contact head 196 that is sized to fit within the interior space 111 of a harness collection member 106, particularly harness collection member 106*a*. As mentioned above, storage cart 102, and particularly the primary collection member 106*a* thereof, are aligned with the power cylinder 122, but spaced apart therefrom so as to form an intervening space through which the transfer nest 124 passes and into which the harness ejector ram 147 extends in operation. The power cylinder 122 is used primarily to eject small and medium length harnesses 40, 41 from the transfer nest 124 where they are subsequently loaded in the harness collection member 106*a* by the harness collection member loading mechanism 190.

When larger wire harnesses 42 are made by the apparatus 50, a second power cylinder 150 that is disposed on the other side of the mounting plate 127 is used as another ejector to eject the leading connector 73 from the transfer nest 124. This is done for wire harnesses having a length of up to about 10 feet and thereabouts. The second power cylinder 150 is adjustably mounted on the mounting plate 127 in a slot 151 thereof at a preselected distance related to the overall length of the wire harness being produced. The second cylinder 150 also includes a push rod 153 and ram 154 attached thereto that impinges upon the leading connector 73 held in the transfer nest 124. Preferably, the location of the second cylinder 150 is such that the center of the wire harness will generally match the center of the storage cart 102 so that the completed harnesses, in effect, are drawn by the transfer belt 126 to the top portion of the mounting plate 127. Therefore, the handling system is capable of being easily adjusted to accommodate longer harnesses of varying lengths. These longer harnesses are supported by a series of storage rails 114 that are fixed to the storage cart 102 at the tops of the cart posts 105.

In order to eliminate the potential build-up of static electricity within the system 100 during operation which might damage the clips 77 used in programmable connectors 74 applied to the wire harnesses, the harness unloading mechanism 120 is grounded. Additionally, as shown in FIG. 12, the mounting plate 127 includes a brush mount 138 and brush 139 that contacts the transfer belt 126 to prevent the build up thereon of any static electrical charge.

Figure 7:
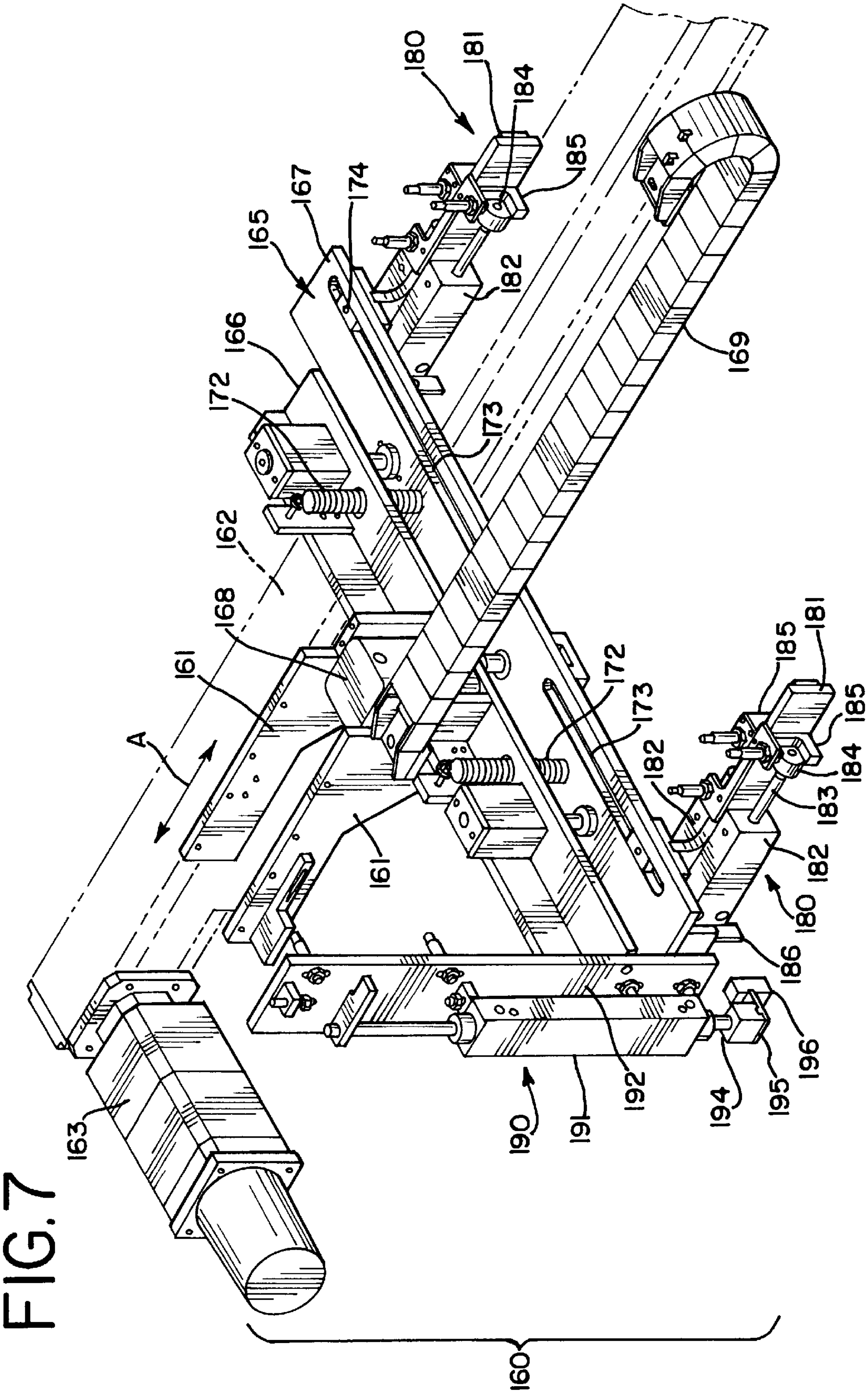
FIG. 7 is a perspective view of the wire harness loading assembly and of the longer length wire harness gripping mechanism used in the system of FIG. 6.
Figure 8:
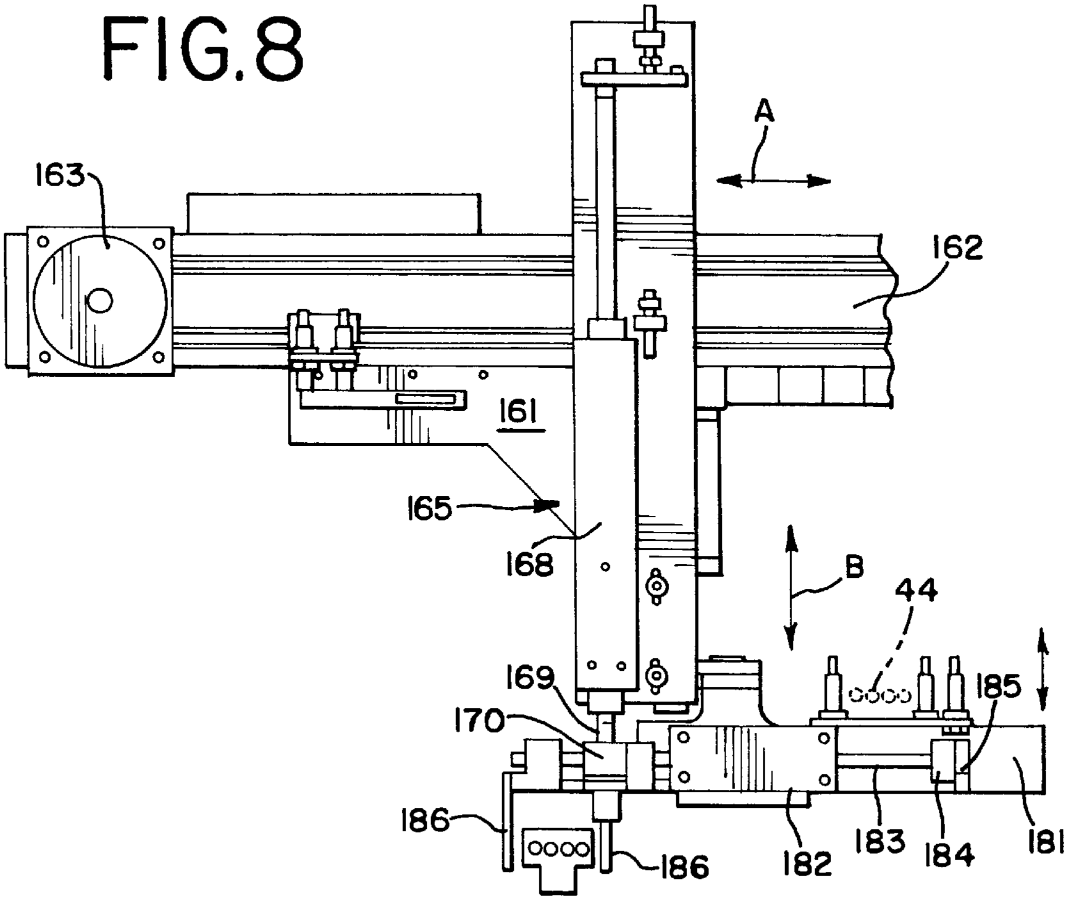
FIG. 8 is a side elevational view of the wire harness loading assembly and gripping mechanism of FIG. 7 in place within the harness handling and storage system of FIG. 6.
Figure 9:
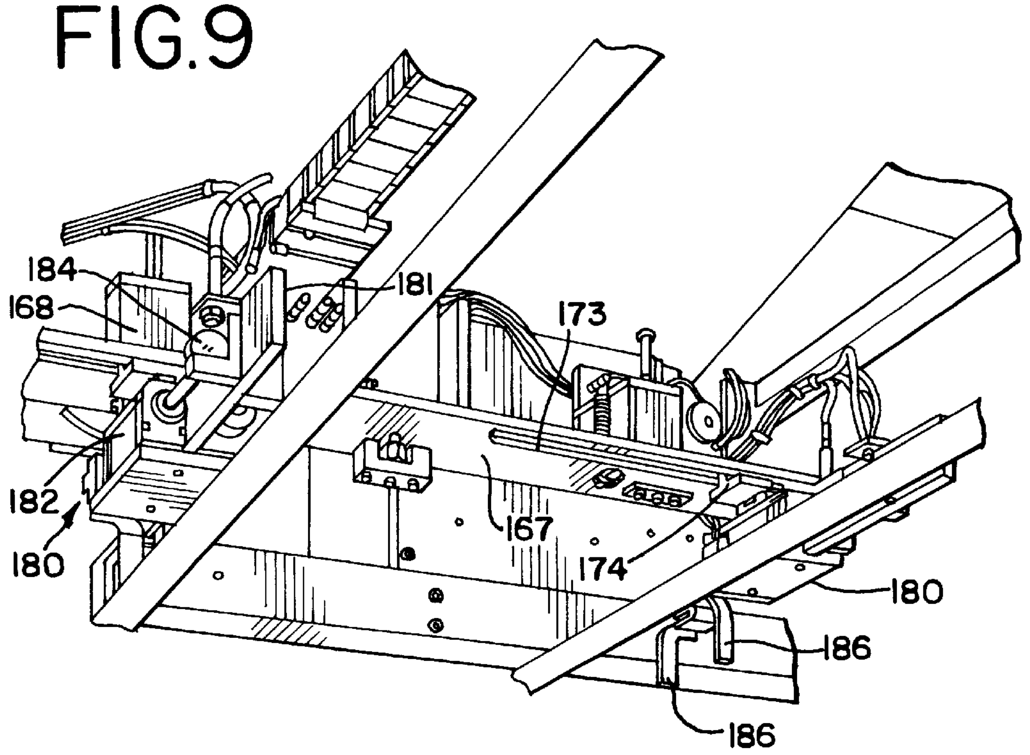
FIG. 9 is a partial perspective view taken from the front of the handling and storage system of FIG. 6, looking upward and illustrating the gripping mechanism in place on the wire harness loading assembly and with the upper mounting plate removed for clarity.

In order to effectuate proper loading of the longer wire harnesses 42 onto the storage cart 102, the system 100 provides a gripping mechanism 160 that is disposed in proximity to and preferably above the traveling transfer belt 126 and above the mounting plate 127 that supports the transfer belt 126. FIG. 7 shows the gripping mechanism in detail. The gripping mechanism 160 includes support frame 161 that engages a linear slide member 162 (shown in phantom in FIG. 7) that defines a travel path for a planetary gear drive assembly 163 to reciprocate along the length of the slide member 162 in the direction of the arrows A shown in FIG. 7. This travel path A constitutes a loading path of the loading assembly 160 that is offset from the transfer path T and generally perpendicular thereto. The slide member 162 is supported above the storage cart 102 on a frame of the system 100 that also supports the carriage 110 mounting plate 127 and preferably has a length that approaches the length of the storage cart 102. A flexible wire raceway 169 is attached to the support frame 161 and receives control wires (not shown) that interconnect the various components of the loading assembly 160.

A vertical movement assembly 165 extends transversely to the slide member 162 and an axis of the storage cart 102. This assembly includes a pair of mounting plates 166, 167, one of which is moved in a reciprocating vertical movement by a power cylinder 168 that is operatively connected to the lower mounting plate 167 to which two wire harness grippers 180 are mounted. One or more extension springs 172 preferably interconnect the two mounting plates 166, 167 together and assist in returning the lower mounting plate 167 to its ready position.

Figure 13:
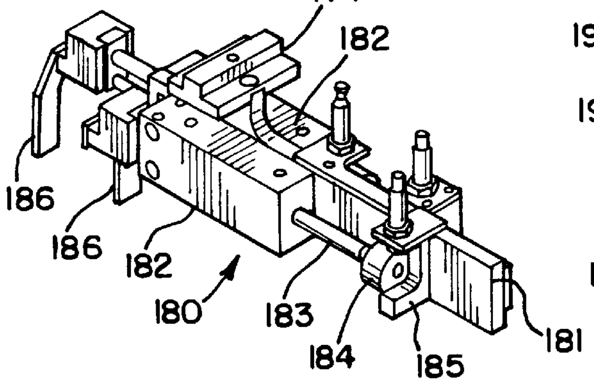
FIG. 13 is a perspective view of one of wire harness grippers used by the gripping mechanism shown in FIGS. 8 & 9; and, FIG. 14 is an enlarged perspective detail view showing the engagement by the harness unloading mechanism of a harness collection member in the handling of smaller and medium length wire harnesses.
Figure 14:
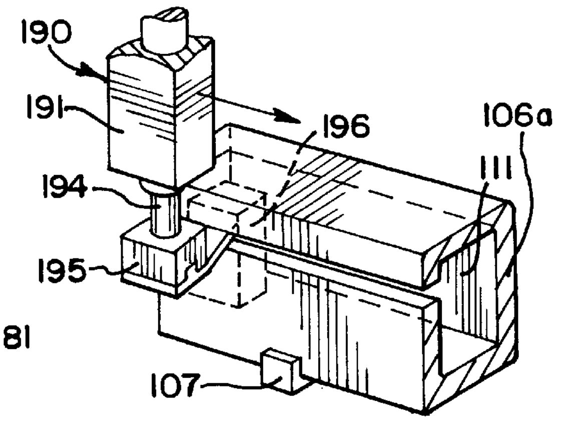

The lower mounting plate 167 is preferably slotted, with two such slots 173 being illustrated in FIG. 7. Two positioner members 174 are received within these slots 173 and may be shifted laterally in order to adjust the grippers 180 to positions between the connectors applied to the wire harnesses 42. As shown best in FIG. 13, each gripper 180 includes an elongated support member 181 that supports a pair of power cylinders 182 having pushrods 183 that extend therethrough. One end of the push rod 183 includes an actuator head 184 that engages a stop 185 in its travel to set the open position of the gripper 180, while the other end of the pushrod 183 has a harness gripping plate 186 mounted thereto. The two cylinders 182 of each gripper 180 cooperate and move together and apart in order to grip and release the wire harnesses. This gripping of the longer length wire harnesses is primarily effected by the gripping plates 186 engaging the wires of the wire harness by gripping the harness wires therebetween.

The gripping of the wire harnesses occurs after the wire harnesses have traversed the top of the mounting plate 127 and are ejected by the second ejector cylinder 150. The grippers 180 are then actuated to grip the wire harness and once gripped, the gear drive assembly 163 moves the support frame 161, and hence the grippers 180 lengthwise along the axis of the storage cart 102 along the linear slide member 162. The gripping mechanism 160 connected by a programmable controller 198 mounted to system 100. The controller 198 preferably includes a memory of sufficient size into which may be fed various operational data, such as the length of the storage cart 102 and its associated storage members 106, the length of the wire harnesses being manufactured by the harness-making apparatus 50, the number of harnesses each harness collection member 106 may receive and other relevant data. Using this information, the controller will actuate the loading assemblies in a controlled manner to carefully pick up and load an appropriate number of assembled wire harnesses onto the storage cart 102. The controller also will serve to actuate the second ejection assembly, i.e., ejection cylinder 150 to eject longer length harnesses from the transfer nest 124, and also to actuate the gripping mechanism 180 to pick up and place the longer wire harnesses on the storage cart 102 and particularly on the topmost fixed storage members 114. Inasmuch as this controller controls the movement of the gripping mechanism 160 which includes the support frame 161 and the two mounting plates 166, 167, it also controls the lengthwise movement of the short and medium length wire harness collection member loading mechanism 190 and particularly the movement of the wire harness connector contact head 196 within the harness collection member 106*a*. With the information as to the length of the harness collection member 106*a*, the width of the harness leading connectors 73 etc., the unloading mechanism 190 also utilizes a common controlled movement to handle the completed wire harnesses as they are stored in the harness collection members 106. Therefore, the likelihood of tangling of the wire harnesses or the overloading of the collection members 106 is substantially reduced. In addition, because the wire harnesses are stored in vertical position, it is easy to enclose them in individual bags to protect the chips of any programmable connectors from damage due to electrostatic discharges.

It will be appreciated that the present invention provide a wire harness handling and storage system that is adaptable to handle and store wire harnesses of various sizes without tangling occurring. Additionally, because the loading and gripping mechanism, especially the transfer belt 124 are grounded, the possibility of electrostatic discharges occurring and damaging the circuits on the programmable connectors is significantly reduced.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

We claim:

1. An apparatus for handling and storing wire harnesses assembled by a wire harness-making machine, in which each of the assembled wire harnesses has a plurality of elongated harness wires with a plurality of connector elements terminated to said harness wires at different locations spaced apart from each other lengthwise along said wire harness, the harness-making machine having a carriage assembly that holds leading connectors of each of said assembled wire harnesses and conveys said assembled wire harnesses in serial order to a discharge station of said wire harness-making machine where said assembled wire harnesses are discharged, said handling and storage apparatus comprising:

a wire harness storage assembly including a plurality of storage members for supporting said assembled wire harnesses irrespective of their length;

a transfer assembly supported on a frame that is interposed between the harness-making machine discharge station and the wire harness storage assembly, the transfer assembly being further disposed in alignment with said harness-making machine discharge station for transferring said assembled wire harnesses to said wire harness storage assembly, the transfer assembly including a transfer nest that receives therein, in serial order, said leading connectors of said assembled wire harness discharged at said harness-making machine discharge station, the transfer nest being movable along a transfer path between a first operative position where it is aligned with said wire harness-making machine discharge station and at least a second operative position along said transfer path, the second operative position being spaced apart from the first operative position and wherein at said first operative position said wire harnesses held by said transfer nest are aligned with said wire harness storage assembly;

a first ejection assembly for ejecting said assembled wire harnesses whose leading connectors are held by said transfer nest, the first ejection assembly being positioned on said transfer assembly at a first location along said transfer path, and further being aligned with said wire harness storage assembly and spaced apart therefrom to define an intervening space through which said transfer nest moves as it moves along said transfer path from said first to said second operative positions; and, a loading assembly aligned with said first ejection assembly for loading said assembled wire harnesses, in serial order, onto said wire harness storage members of said wire harness storage assembly.

2. The wire harness handling and storage apparatus as defined in claim 1, wherein said wire harness storage members include a single, first storage member disposed at a first wire harness-receiving location on said storage assembly, and a plurality of second storage members disposed at a like plurality of different storage locations on said wire harness storage assembly, the first storage member being aligned with said first ejection assembly and, said first storage member being interchangeable with said second storage members.

3. The wire harness handling and storage apparatus as defined in claim 1, further including a second ejection assembly disposed along said transfer path and spaced apart from said first ejection assembly.

4. The wire harness handling and storage apparatus as defined in claim 1, wherein said storage assembly includes a wheeled storage cart and said storage members are disposed on the storage cart at different elevations, at least one of said storage members being disposed on said storage cart at a common elevation to and in alignment with said first ejection assembly.

5. The wire harness handling and storage apparatus as defined in claim 4, wherein said storage members include a plurality of elongated hollow tubes, each of the tubes having an interior portion that receives said leading connectors of said assembled wire harness under action of said loading assembly, said tubes each further including a slot running lengthwise along said tube communicating with said interior portion, the slot receiving said harness wires of said assembled harnesses therein such that the remainders of each assembled wire harness hang from said storage member.

6. The wire harness handling and storage apparatus as defined in claim 4, wherein said storage members include a plurality of first storage members for supporting assembled wire harnesses having a first preselected length and a plurality of second storage members for supporting assembled wire harnesses of a second preselected length that is longer that said first preselected length, said first storage members being removably supported on said storage cart and said second storage members being fixedly supported on said storage cart.

7. The wire harness handling and storage apparatus as defined in claim 6, wherein said first storage members include a primary first storage member that is supported by said storage cart in alignment with both said first ejection assembly and said loading assembly.

8. The wire harness handling and storage apparatus as defined in claim 7, wherein said first storage members include a plurality of secondary first storage members supported on said storage cart at different storage levels, said primary and secondary first storage members being interchangeable with each other.

9. The wire harness handling and storage apparatus as defined in claim 1, wherein said loading assembly is selectively movable along a loading path that is angularly offset with respect to said transfer path.

10. The wire harness handling and storage apparatus as defined in claim 9, wherein said loading assembly loading path is generally perpendicular to said transfer path.

11. The wire harness handling and storage apparatus as defined in claim 9, wherein said loading assembly is aligned with one of said storage members of said storage assembly, and said loading assembly includes a loading ram movable by said loading assembly into and out of contact with said assembled wire harness leading connectors for moving said assembled wire harnesses out of said transfer nest and into said storage member.

12. The wire harness handling and storage apparatus as defined in claim 3, wherein said loading assembly extends between said first and second ejection assemblies and said loading assembly is selectively movable along a path generally parallel to said first and second ejection assemblies and generally perpendicular to said transfer path.

13. The wire harness handling and storage apparatus as defined in claim 12, wherein said loading assembly includes a pair of grippers for engaging said wires of said assembled wire harnesses, said grippers being capable of selective vertical and horizontal movement.

14. The wire harness handling and storage apparatus as defined in claim 1, wherein said loading assembly includes first and second distinct loading members for loading assembled wire harnesses of different lengths onto said storage assembly, said apparatus further including a controller having a programmable memory for receiving data pertaining to lengths of said wire harnesses and storage members, whereby said loading assembly may determine the number of assembled wire harnesses to be supported on said storage members.

15. The apparatus of claim 1, wherein said first ejection assembly includes a first loading ram that is reciprocatable along a first loading path that is perpendicular to said transfer path and said storage members include first and second storage members, said first storage members being hollow and for receiving said leading connectors of said wire harnesses therein, said first loading ram being received within interior portions of said first storage members as it reciprocates along said first loading path.

16. The apparatus of claim 15, wherein said loading assembly includes a pair of wire harness gripping members that are reciprocatable along a second loading path, said second storage members extending lengthwise and parallel to said second loading path for supporting said wire harnesses thereon, so that said wire harness gripping members being adapted reciprocate in movement along said second storage members.

17. The apparatus of claim 1, wherein transfer assembly includes an endless belt rotatably supported on said transfer assembly frame and driven along said transfer path by a motor, said transfer path extending from a location near said carriage assembly to a location near at least one of said storage members, and said storage members being disposed on said storage assembly at different elevations.

18. The apparatus of claim 1, wherein said loading assembly includes a linear slide member extending away from said transfer path, a loading assembly support frame slidably mounted on said linear slide member, means for reciprocatably driving said loading assembly support frame along said slide member, and a mounting assembly for mounting said first ejection assembly to said loading assembly support frame.

19. The apparatus of claim 1, further including a static electricity prevention assembly mounted to said apparatus and grounded thereto and in contact with said transfer assembly to prevent build up of static electricity on said transfer assembly.

20. The apparatus of claim 1, further including a programmable controller for controlling the movement of said first and second loading assemblies along said loading path.

21. The apparatus of claim 1, wherein said storage assembly includes a storage cart supporting said storage members at different elevations thereon.

22. An apparatus for handling and storing wire harnesses assembled by a wire harness-making machine, in which each of the assembled wire harnesses has a plurality of elongated harness wires with a plurality of connector elements terminated to said harness wires at different locations spaced apart from each other lengthwise along said wire harness, the harness-making machine having a carriage assembly that holds leading connectors of each of said assembled wire harnesses and conveys said assembled wire harnesses in serial order to a discharge station of said wire harness-making machine where said assembled wire harnesses are discharged, said apparatus comprising:

a transfer assembly for transferring said assembled wire harnesses to a wire harness storage location, the transfer assembly being supported on a frame assembly, said transfer assembly being aligned with said harness-making machine discharge station said transfer assembly including a transfer nest that receives therein, in serial order, said leading connectors of said assembled wire harness discharged at said harness-making machine discharge station, the transfer nest being movable along a transfer path on said transfer assembly between a first operative position on said transfer assembly where it is aligned with said wire harness-making machine discharge station and at least a second operative position on said transfer assembly, the second operative position being disposed along said transfer path and spaced apart from the first operative position and, wherein said wire harnesses held by said transfer nest are aligned with a storage assembly for receiving a plurality of assembled wire harnesses;

the storage assembly including a plurality of storage members for supporting said assembled wire harnesses irrespective of their length;

a first ejection assembly disposed on said transfer assembly for ejecting, at a first location along said transfer path, said assembled wire harnesses whose leading connectors are held by said transfer nest;

a second ejection assembly for ejecting, at a second location along said transfer path, said assembled wire harnesses whose leading connectors are held by said transfer nest, the first and second ejection assemblies being disposed on said transfer assembly and spaced apart from each other along said transfer path.

23. An apparatus for handling wire harnesses assembled by a wire harness-making machine and storing the wire harnesses in a manner that reduces tangling, the wire harnesses including a plurality of electrical harness wires and a plurality of electrical connectors terminated to said wires at different locations along the length of said wire harnesses, said wire harness-making machine being capable of assembling said wire harnesses in lengths from as short as about 6 inches in length to as long as about 10 feet in length, the harness-making machine assembling said wire harnesses together by terminating free ends of said wires to a leading connector held within a reciprocating harness carriage and subsequently terminating additional connectors to said harness wires in remaining portions of said wire harnesses, said harness-making machine discharging said wire harnesses at a discharge location by discharging said leading connectors from said harness carriage, the wire harness and storage apparatus comprising:

a moveable storage assembly that removably engages said harness-making machine in proximity to said discharge location thereof, the storage assembly having a plurality of storage members for supporting multiple wire harnesses thereon, said storage assembly being removable from engagement with said harness-making machine when filled with said wire harnesses and movable to another location without disrupting placement of said wire harnesses on said storage members, said storage members being disposed on said storage assembly in positions spaced apart from said harness carriage, a wire harness transfer assembly supported on a frame in proximity to said discharge location, the wire harness transfer assembly being movable along a transfer path between said discharge location and said storage members of said storage assembly, the wire harness transfer assembly including a wire harness transfer nest that receives wire harnesses discharged from said harness carriage at said discharge location and transfers said wire harnesses to at least one loading location disposed along said transfer path, a loading assembly for loading wire harnesses transferred by said transfer nest to said loading location onto said storage members, said loading assembly including a loading assembly frame, first and second ejection assemblies spaced apart from each other and disposed on said loading assembly frame at different, first and second locations along said transfer path, said first and second ejection assemblies having respective first and second ejection members that are selectively movable into and out of engagement with said wire harnesses engaged by said transfer nest to eject them therefrom, said loading assembly further including first and second loading members for loading said wire harnesses respectively ejected from said transfer nest by said first and second ejection assemblies, said first and second loading members being reciprocatable along a loading path that is offset from said transfer path to thereby load said wire harnesses on said storage members in side-by-side order irrespective of the length of said wire harnesses.

24. An apparatus for handling and storing wire harnesses assembled by a wire harness-making machine, in which each of the assembled wire harnesses has a plurality of elongated harness wires with a plurality of connector elements terminated to said harness wires at different locations spaced apart from each other lengthwise along said wire harness, the harness-making machine having a carriage assembly that holds leading connectors of each of said assembled wire harnesses and conveys said assembled wire harnesses in serial order to a discharge station of said wire harness-making machine where said assembled wire harnesses are discharged, said wire harness handling and storing apparatus comprising:

a transfer assembly supported on a frame aligned with said harness-making machine discharge station for transferring said assembled wire harnesses to a wire harness storage location, the transfer assembly including a transfer nest that receives therein, in serial order, said leading connectors of said assembled wire harness discharged at said harness-making machine discharge station, the transfer nest being movable along a transfer path between a first operative position aligned with said wire harness-making machine discharge station and at least a second operative position disposed along said transfer path and spaced apart from the first operative position and wherein said wire harnesses held by said transfer nest are aligned with a storage assembly adapted to receive a plurality of assembled wire harnesses;

the storage assembly including a plurality of storage members for supporting said assembled wire harnesses irrespective of their length and, said storage assembly further including a wheeled storage cart and said storage members being disposed on the storage cart at different elevations;

an ejection assembly for ejecting said assembled wire harness whose leading connectors are held by said transfer nest, the ejection assembly being disposed on said transfer assembly frame and being aligned with said storage assembly and spaced apart therefrom to define an intervening space through which said transfer nest moves in its transfer path from said first to said second operative positions; and, a loading assembly aligned with said ejection assembly for loading said assembled wire harnesses, in serial order, onto said wire harness storage members, and at least one of said storage members being disposed on said storage cart at a common elevation to and in alignment with said ejection assembly.

* * * * *